United States Patent
Irie

(10) Patent No.: US 6,824,315 B2
(45) Date of Patent: Nov. 30, 2004

(54) OPTICAL MODULE

(75) Inventor: Takeshi Irie, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 154 days.

(21) Appl. No.: 10/322,810

(22) Filed: Dec. 19, 2002

(65) Prior Publication Data

US 2003/0138222 A1 Jul. 24, 2003

(30) Foreign Application Priority Data

Dec. 19, 2001 (JP) .................................... P2001-386450

(51) Int. Cl.[7] ............................................... G02B 6/36
(52) U.S. Cl. .............................. 385/92; 385/88; 385/94
(58) Field of Search ............................... 385/88–94, 14, 385/49

(56) References Cited

U.S. PATENT DOCUMENTS 6,358,066 B1 * 3/2002 Gilliland et al. ........... 439/76.1
2002/0146208 A1 * 10/2002 Nakura et al. ............... 385/53
2003/0091303 A1 * 5/2003 Kami et al. .................... 385/92
2004/0037517 A1 * 2/2004 Dair et al. ..................... 385/92

* cited by examiner

Primary Examiner—Hemang Sanghavi
(74) Attorney, Agent, or Firm—McDermott Will & Emery LLP

(57) ABSTRACT

The present invention provides an optical module capable of reducing the amount of electrostatic charges on a shielding member. The optical module comprises an assembly portion and a shielding member. The assembly portion includes a light receiving device, an electronic element, a circuit board, and a plurality of terminals. The light receiving device includes a semiconductor optical element. The semiconductor optical element is optically coupled to an optical connector. The electronic element is electrically connected to the semiconductor optical element. The circuit board mounts the electronic element thereon. The plurality of terminals is electrically connected to the circuit board. The shielding member includes a reference terminal provided so as to be connected to a reference potential line, and shields the assembly portion. In this optical module, the assembly portion is provided with an electrically conductive piece provided so as to connect the shielding member to at least one of the plurality of terminals.

18 Claims, 7 Drawing Sheets

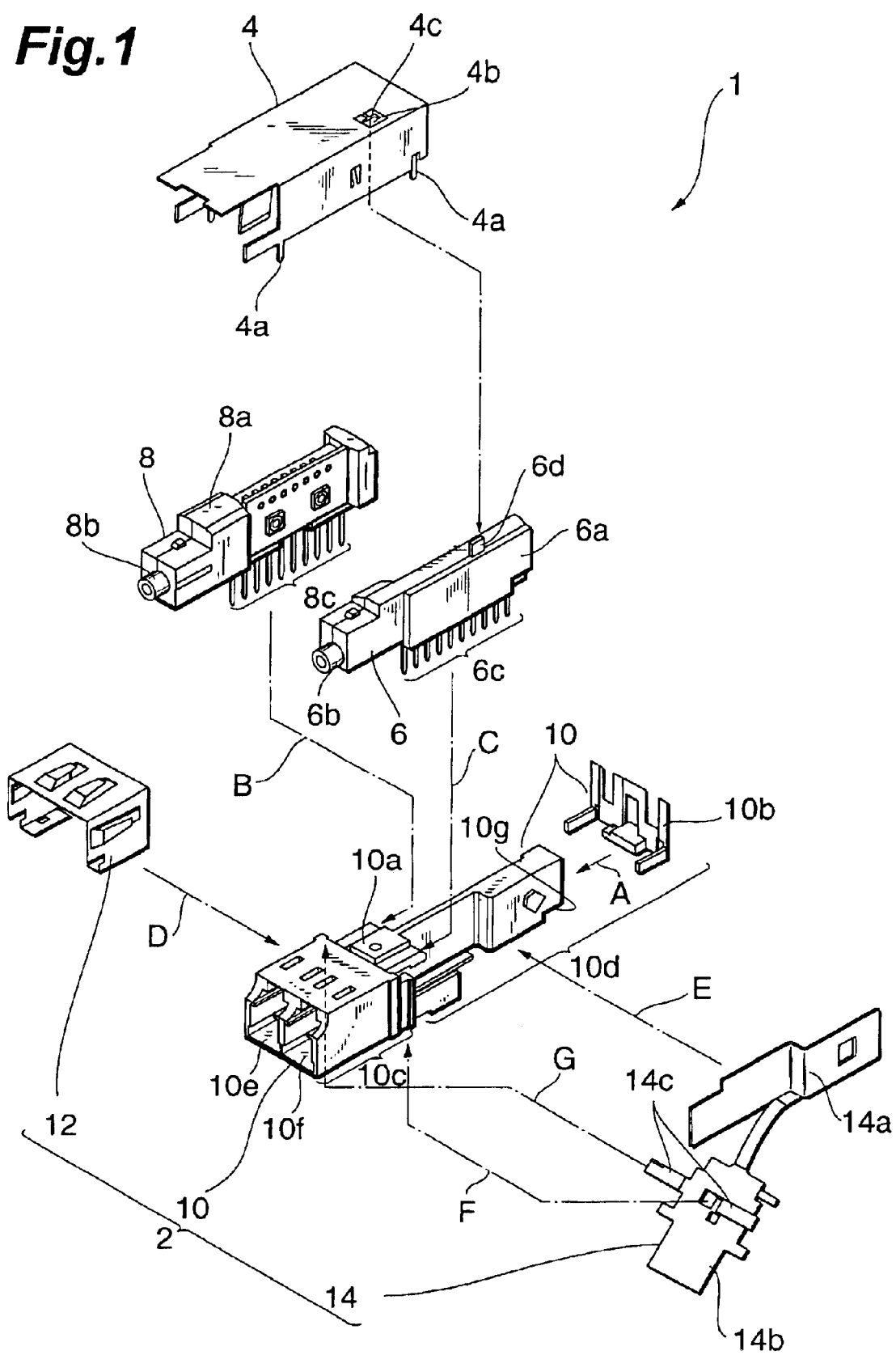

OPTICAL MODULE

BACKGROUND OF THE INVENTION

1. Field of the Invention

The present invention relates to an optical module.

2. Related Background of the Invention

There are several kinds of optical modules, such as optical receiver modules, optical transmitter modules, and optical transceiver modules. An optical receiver module includes a light receiving element and converts optical signals into electrical signals. An optical transmitter module includes a light emitting element and converts electrical signals into optical signals. An optical transceiver module includes a receiver assembly and a transmitter assembly. The receiver assembly includes a light receiving element and converts optical signals into electrical signals. The transmitter assembly includes a light emitting element and converts electrical signals into optical signals.

SUMMARY OF THE INVENTION

One type of these optical modules includes a metal cover for stabilizing the electrical operation thereof. The present inventors have researched the improvement of the reception sensitivity for the receiver assembly and for the optical receiver module of the above structure. In this research, the present inventors have conducted a variety of experiments to improve the reception sensitivity. As a result, the present inventors have discovered that the electrical charging of the metal cover degrades the reception sensitivity. Therefore, the present inventors have carried out studies on a structure for adding a grounding terminal to the module in order to remove electrostatic charges on the metal cover.

However, there are a number of standards for optical modules that regulate pin assignments, such as the position of a grounding terminal. When developing an optical module that are required to satisfy a standard of these standards, it is not easy to add a grounding terminal to the optical module due to the restriction of the standard. Examples of the standards for optical modules include SFF (Small Form Factor) standard, which relates to optical transceiver modules.

It is, therefore, an object of the present invention to provide an optical module that permits a reduction in the electrical charging of a shielding member.

The optical module according to the present invention comprises an assembly portion and a shielding member. The assembly portion includes an optical device, an electronic element, a circuit board, and a plurality of terminals. The optical device includes a semiconductor optical element. The semiconductor optical element is provided so as to be optically coupled to an optical connector. The electronic element is electrically connected to the semiconductor optical element. The circuit board mounts the electronic element thereon. The plurality of terminals is electrically connected to the circuit board. Further, the shielding member has a reference potential terminal provided so as to be connected to a reference potential line, and shields the assembly portion. In this optical module, the assembly portion has an electrically conductive portion provided so as to connect the shielding member with at least one of the plurality of terminals.

In the optical module, the shielding member is electrically connected to at least one a terminal of the terminals of the assembly portion because the electrically conductive portion of the assembly portion connects the shielding member with at least one of the plurality of terminals.

In the optical module according to the present invention, the assembly portion may include a lead frame member. The lead frame member has an island, first leads, and a second lead. On the island, the circuit board is mounted. The first leads constitute the above-mentioned plurality of terminals, and the second lead constitutes the above-mentioned electrically conductive portion.

The optical module according to the present invention may further comprise an inductive element electrically coupled between the electronic element and the electrically conductive portion. The inductive element reduces the interference of a high frequency component, propagating through the electrically conductive portion, with the electronic element. Further, the inductive element may include a ferrite bead inductor provided on the circuit board.

In the optical module according to the present invention, the circuit board may have a pair of faces and an electrically conductive layer provided on one face of this pair of faces. The electronic element is mounted on the other face of the pair of faces. The island mounts the circuit board thereon through an insulating member.

The insulating member electrically isolates the circuit board from the island, and this island is therefore electrically connected to the circuit board through the inductive element.

The optical module according to the present invention can be provided with the following configurations. The circuit board comprises a pair of edges that extend in a direction of a predetermined axis. The ends of the terminals are arranged along one edge of the pair of edges of the circuit board. The shielding member is provided so as to face the other edge of the pair of edges of the circuit board. The electrically conductive portion is provided so as to extend from one edge of the pair of edges to the other and reaches the shielding member.

In this optical module, the circuit board is provided between the shielding member and the plurality of terminals. The electrically conductive portion is provided so as to extend across a pair of edges of the circuit board. The electrically conductive portion is electrically connected to the shielding member in a region different from the region in which the plurality of terminals are located.

In the optical module according to the present invention, the semiconductor optical element may be a semiconductor light receiving element, and the optical device and the circuit board may be arranged in a direction of a predetermined axis. The electrically conductive portion and the shielding member are connected with each other in a region located in a direction different from the direction in which optical signals propagate.

The optical module according to the present invention may further comprise an additional assembly portion and a housing. The additional assembly portion includes a light emitting device, an additional circuit board, and a plurality of additional terminals. The light emitting device includes a semiconductor light emitting element, and this semiconductor light emitting element is provided so as to be optically coupled to an optical connector. The additional circuit board mounts an additional electronic element electrically connected to the semiconductor light emitting element. The additional circuit board is electrically connected to the additional terminals. The housing includes a holding portion and a receptacle portion. The holding portion holds the assembly portion and the additional assembly portion. The receptacle portion is provided so as to receive the optical connector therein.

The additional circuit board has a pair of edges extending in a direction of a predetermined axis. The ends of the terminals of the additional assembly portion are arranged along one edge of the pair of edges of the additional circuit board. The shielding member is provided so as to face the other edge of the pair of edges of the circuit board. The shielding member shields the additional assembly portion. In the optical module, the assembly portion and the additional assembly portion are capable of implementing the transmission or reception of optical signals and are shielded by the shielding member connected to the electrically conductive portion.

In the optical module according to the present invention, the assembly portion and the additional assembly portion are arranged along a predetermined plane. In this arrangement, the optical module can be provided with a number of assembly portions and an electrically conductive portion that is electrically connected to the shielding member.

The optical module according to the present invention may further comprise a resin member for molding the assembly portion. The end of the electrically conductive portion protrudes from the resin member. According to this optical module, the electrically conductive portion is electrically connected to the shielding member with the electronic element molded by the resin member.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1 is an exploded perspective view showing an optical module according to the present embodiment;

Figure 2A:
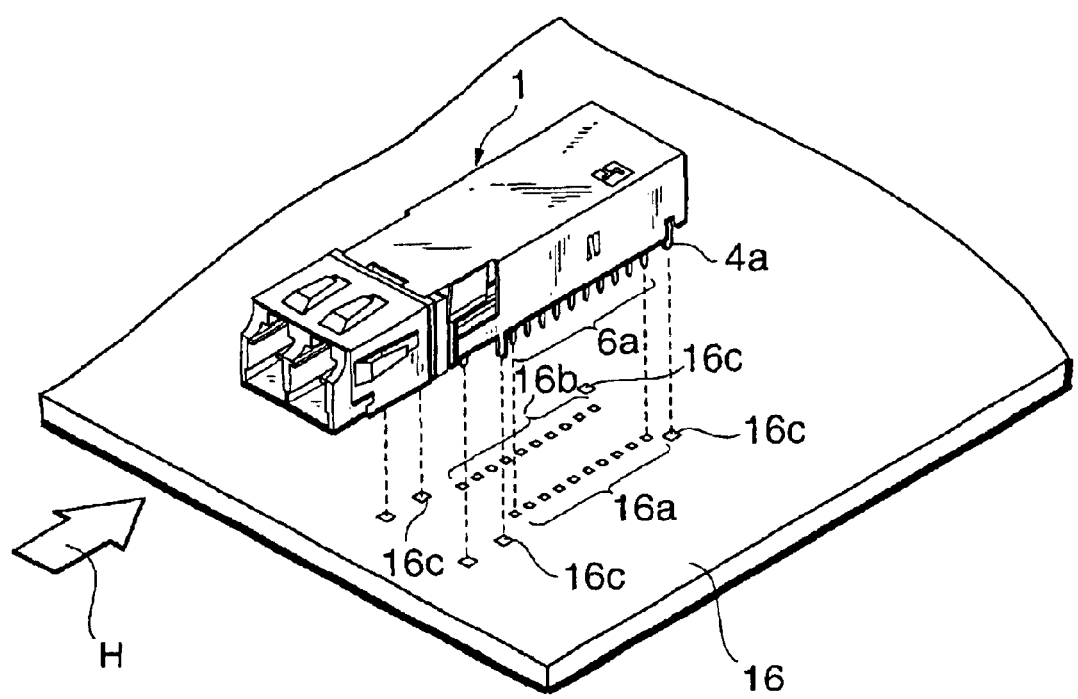
FIG. 2A is a perspective view showing a printed circuit board and the optical module according to the present embodiment.

The above object, other objects, features and advantages of the present invention will become apparent from the following detailed description of the preferred embodiments of the present invention with reference to the accompanied drawings.

DESCRIPTION OF THE PREFERRED EMBODIMENTS

The teachings of the present invention can be easily understood through consideration of the following detailed description with reference to the drawings shown to exemplify the present invention. Where possible, the identical or similar parts are referred to as the same reference symbols.

FIG. 1 is an exploded perspective view showing an optical module according to the present embodiment. An optical module 1 comprises a housing 2, a shielding member 4, a receiver assembly 6, and a transmitter assembly 8. The receiver assembly 6 and transmitter assembly 8 each include a semiconductor optical element.

The receiver assembly 6 comprises a resin member 6a, a sleeve 6b, a plurality of lead terminals 6c, and an electrically conductive portion 6d. The sleeve 6b protrudes from the resin member 6a in a direction of a predetermined axis. A semiconductor optical element, such as a semiconductor light receiving element is provided so as to face the other end of the sleeve 6b. The optical axis of the semiconductor light receiving element is aligned with in a direction of the predetermined axis. The ends of the lead terminals 6c are arranged along one edge of a pair of edges of the resin member 6a and the lead terminals 6c extend in a direction intersecting the optical axis. The electrically conductive portion 6d, such as an electrically conductive piece, is provided on the other edge of the pair of edges of the resin member 6a and is provided so as to be oriented in a direction intersecting the optical axis. The transmitter assembly 8 has a resin member 8a, a sleeve 8b, and a plurality of lead terminals 8c. The sleeve 8b protrudes from the resin member 8a in a direction of the predetermined axis. A semiconductor optical element, such as a semiconductor light emitting element, is provided so as to face the other end of the sleeve 8b. The optical axis of the semiconductor light emitting element is aligned with a direction of the predetermined axis. The plurality of lead terminals 8c are arranged so as to be oriented in a direction intersecting the optical axis.

The housing 2 has a frame 10, a receptacle shield 12, and an assembly shield 14. As shown by Arrow A, a resin main body 10a and a rear wall 10b is combined to form the frame 10. Further, the housing 10 has a receptacle portion 10c and assembly accommodating portion 10d which are arranged in a direction of the predetermined axis. The receptacle portion 10c has a pair of receiving holes 10e and 10f extending in a direction of the predetermined axis to the assembly accommodating portion 10d. The receiving holes 10e and 10f have shapes capable of receiving an optical connector therein. A partition wall 10g extends in a direction of the predetermined axis and partitions an assembly accommodating portion 10d. As shown by Arrows B and C, the receiver assembly 6 and the transmitter assembly 8 are inserted into the receiving holes 10e and 10f in respective directions. The receiver assembly 6 and the transmitter assembly 8 are thus arranged such that the partition wall 10g is located therebetween.

As shown by Arrow D, the receptacle shield 12 is mated with the receptacle portion 10c. The receptacle shield 12 is thus disposed on the three outer walls, extending in a direction of a predetermined axis, of the receptacle portion 10c to shield not only the receiver assembly 6 and transmitter assembly 8 but also the optical connector inserted in the receiving holes 10e and 10f.

As shown by Arrow E, the assembly shield 14 has a partition portion 14a disposed along the partition 10g. The partition portion 14a electrically shields the receiver assembly 6 and a transmitter assembly 8. The assembly shield 14 has a bottom portion 14b, which is provided on the bottom of the receptacle portion 10c, and a pair of arm portions 14c extending respectively from a pair of edges of the bottom portion 14b. As shown by Arrows F and G, these arm portions 14c are arranged along the respective side walls of the receptacle portion 10c and are mated with the top of the receptacle portion 10c.

The shielding member 4, such as cover, is formed of an electrically conductive member. The shielding member 4 covers the assembly accommodating portion 10d. Thus, the receiver assembly 6 and the transmitter assembly 8 in the assembly accommodating portion 10d can be electrically shielded while these assemblies 6 and 8 are contained in the housing 10. The shielding member 4 has one or more terminals 4a extending in the same direction as the lead terminals of the receiver assembly 6 or the transmitter assembly 8. When optical module 1 is provided on a printed circuit board, the plurality of terminals 4a are electrically connected to this substrate. Further, the shielding member 4 has a connecting hole 4b in its top plate portion, and a connecting protrusion 4c provided inside the connecting hole 4b. The connecting protrusion 4c can make electrical contact with the electrically conductive portion 6d of the receiver module 6. Consequently, the shielding member 4 is electrically connected to the lead terminals 6c without any additional lead terminal. The electrically conductive portion 6d may be connected to the connecting protrusion 4c through soldering member.

FIG. 2A is a perspective view showing the optical module 1 and a printed circuit board 16. The printed circuit board 16 comprises through holes 16a for the lead terminals 6a of the receiver assembly 6, through holes 16b for the lead terminals 8a of the transmitter assembly 8, and through holes 16c for the terminals 4a of the shielding member 4. The optical module 1 receives therein the optical connector which is inserted into the optical module 1 in the direction of Arrow H with the optical module 1 mounted on the printed circuit board 16.

Figure 2B:
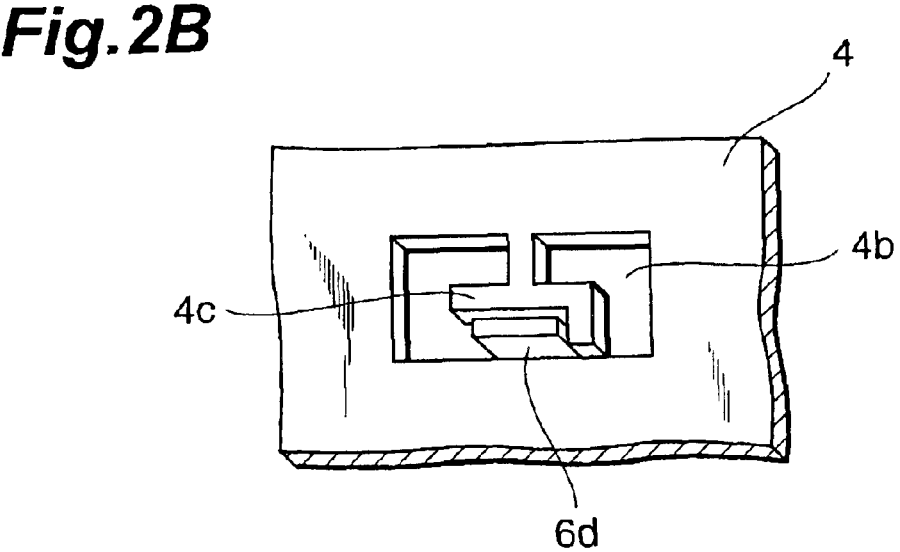
FIG. 2B is an enlarged view showing the contact between an electrically conductive portion and the shielding member.

FIG. 2B is an enlarged view showing the vicinity of the connecting hole 4b of the shielding member 4. The electrically conductive portion 6d of the receiver assembly 6 exhibits not only electrically conductivity but also elasticity, and the electrically conductive portion 6d is therefore supported by one or more faces of the connecting protrusion 4c of the shielding member 4 because of an elastic force. Consequently, the electrically conductive portion 6d can be electrically connected to the shielding member 4 in a reliable manner.

Figure 3A:
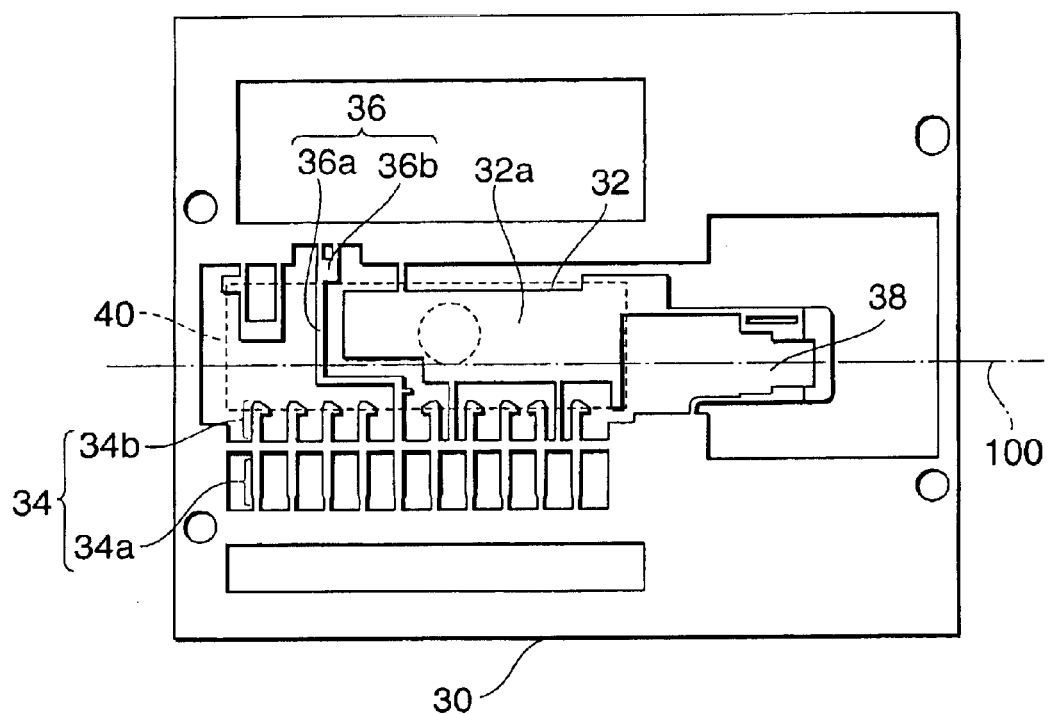
FIG. 3A is a plan view showing a lead frame.

A description will be provided for the receiver assembly 6. FIG. 3A shows a lead frame 30 for the receiver assembly 6. In the lead frame 30, an island 32 and a light receiving device placement portion 38 are arranged in a direction of the predetermined axis. After a circuit board (reference numeral 40 in FIG. 4) and a light receiving device (reference numeral 52 in FIG. 5A) having a semiconductor light receiving element are mounted on the lead frame 30 to form a resulting assembly, the lead frame in the resulting assembly is cut off to form a lead frame member 30a composed of the principal parts of the lead frame 30.

Figure 3B:
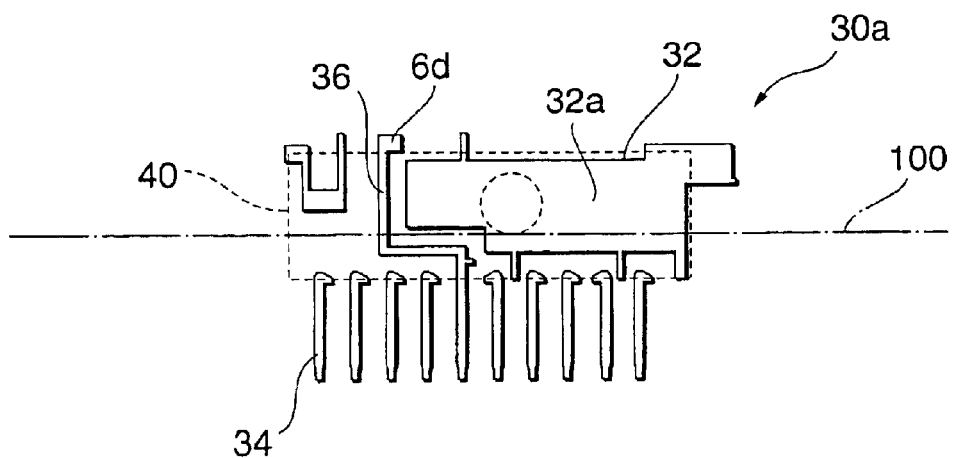
FIG. 3B is a planar view showing a lead frame member.

FIG. 3B shows the lead frame member 30a constituted by the principal part of the lead frame 30. The principal part of the lead frame 30 comprises the island 32, the lead terminals 34, and an electrically conductive portion 36. When the lead frame member resin molded by the resin member, the outer leads 34a of the lead terminals 34, and the electrically conductive element 36b of the electrically conductive portion 36 are not covered by the resin member and are thus seen in an external view of the light receiver assembly 6.

Referring now to FIGS. 3A and 3B, the plurality of lead terminals 34 are arranged in a direction of a predetermined axis 100. The lead terminals 34 extend in a direction intersecting the predetermined axis 100 and each terminal has an inner lead portion 34a and an outer lead portion 34b. One terminal of the lead terminals 34 is connected to the electrically conductive portion 36. The electrically conductive portion 36 includes a connecting lead 36a and an electrically conductive element 36b. The connecting lead 36a extends from a certain inner lead 34a in a direction intersecting the predetermined axis 100 while being spaced apart from the island 32, and the electrically conductive element 36b is provided at one end of the connecting lead 36a. The broken line in FIGS. 3A and 3B indicates the area on which the circuit board (reference numeral 40 in FIG. 4) is to be located.

Figure 4:
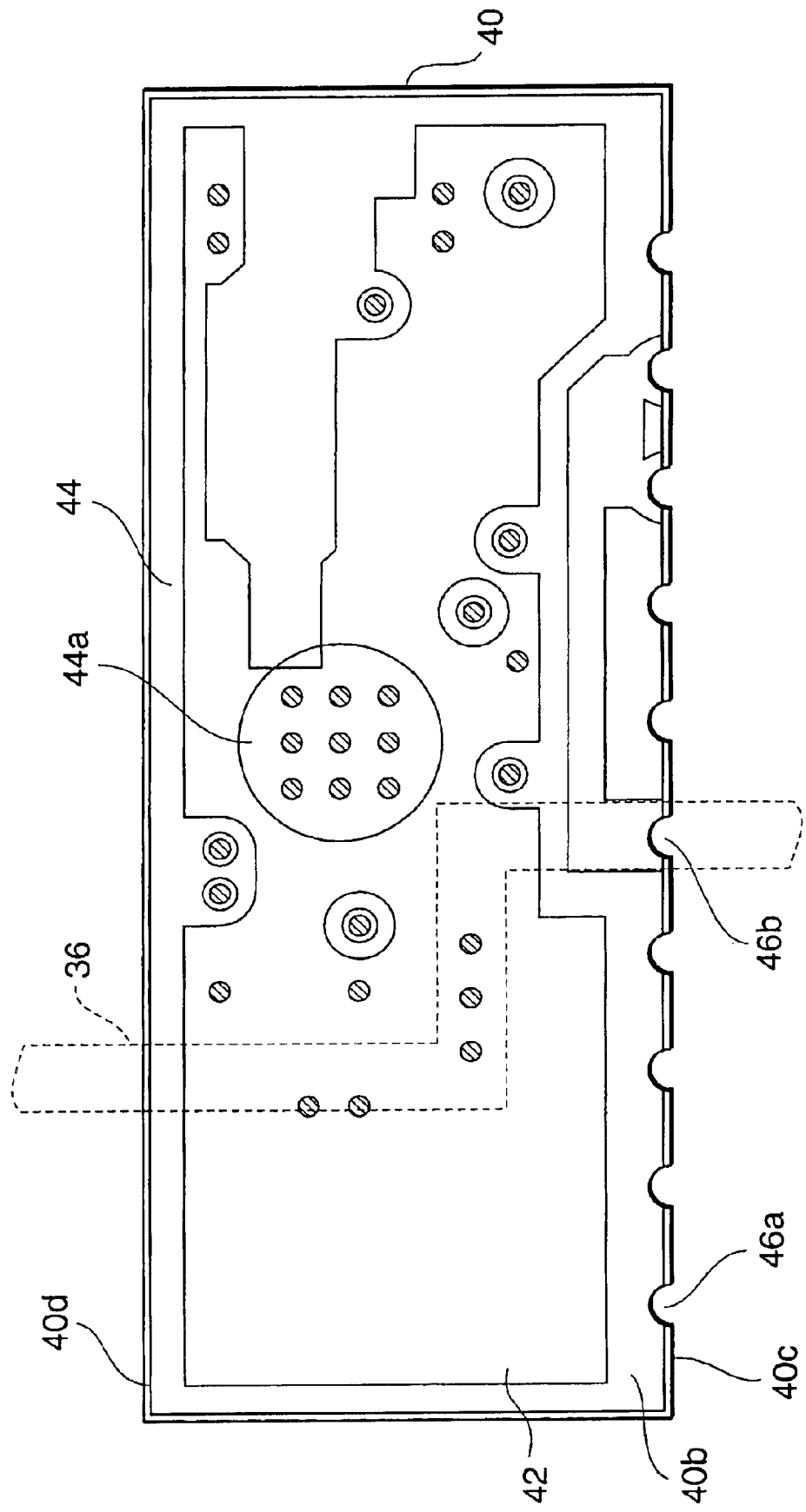
FIG. 4 is a plan view showing the back side of the circuit board.

FIG. 4 shows a circuit board 40 for the receiver assembly 6. The circuit board 40 has a base exhibiting, for example, a thermal expansion coefficient equal to or more than 12 ppm per degree (12 ppm/degree) and equal to or less than 15 ppm per degree (15 ppm/degree) and a glass transition temperature equal to or more than 173° C. and equal to or less than 183° C. A glass epoxy substrate is preferably used as the circuit board 40. The circuit board 40 has an element mounting face (reference numeral 40a in FIG. 5A) on which an electronic element is mounted, and a contact face 40b that faces the mounting face (reference numeral 32a in FIGS. 3A and 3B) of the island 32. FIG. 4 shows the contact face 40b. A reference potential layer 42 is provided on the contact face 40b. The circuit board 40 further comprises a pair of edges 40c and 40d and provided on one edge 40c are a plurality of electrode portions 46a and 46b. The electrode portions 46a and 46b serve to connect the electrically conductive layers or the circuit board 40 to the inner lead 34a, respectively.

An insulating layer 44 is provided on the contact face 40b. The insulating layer 44 has openings 44a provided at an area on the contact face 40b such that the island 32 can be electrically connected to the reference potential layer 42. The insulating layer 44 is provided on an area other than that of the openings 44a so that the electrically conductive portion 36a is not electrically connected to the reference potential layer 42.

As is indicated by the broken line in FIG. 4, the electrically conductive portion 36 of the lead frame member extends through on the insulating layer 44 from one edge of the pair of edges 40c and 40d of the circuit board 40 to the other so as to be spaced apart from the openings 44a and makes contact with the insulating layer 44. The electrically conductive portion 36 passes through the position of an electrode 46b on the edge 40c. The electrically conductive portion 36 is electrically connected to the circuit board 40 via the electrode 46b.

Figure 5A:
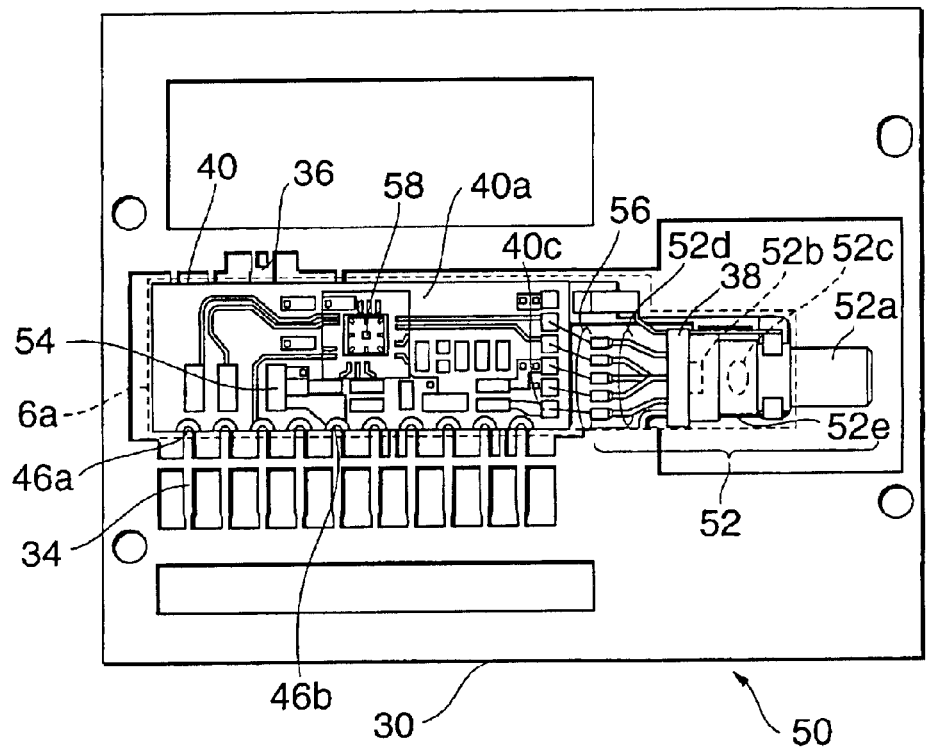
FIG. 5A is plan view showing an workpiece of the receiver assembly.

FIG. 5A shows a workpiece for the receiver assembly 6. The workpiece 50 comprises a lead frame 30, a circuit board 40 and a light receiving device 52. The light receiving device 52 is provided on the light receiving device mounting portion 38. The circuit board 40 is positioned on the island 32 of the lead frame 30 such that the terminals 46a of the circuit board can be connected to the lead terminals 34. Disposed on the circuit board 40 are an inductive element 54, such as a ferrite bead inductor, and an electronic element 58. In the light receiving device 52, a sleeve 52a made of metal, a semiconductor light receiving element 52b, and a lens 52c are arranged in a direction of a predetermined axis. A package 52e for ROSA houses the sleeve 52a, the lens 52c and the semiconductor light receiving element 52b. The package 52e can also house a pre-amplifier electrically connected to the semiconductor light receiving element 52b. The package 52e can be a TO-type package, for example, and has a lead pin 52d extending in a direction of the predetermined axis. The lead pins 52d are electrically connected via bonding wires 56 to pads 40c provided on the mounting face 40a of the circuit board 40, respectively. In order to make the connection, the lead pins 52d are bent such that the end portions thereof are arranged on the extension plane from the mount face 40a. This bending is effected so that the length of the GND lead is the shortest of these lead pins 52d. The lead frame 30, the circuit board 40, and the light receiving device 52 are molded by a sealing resin member 6a after they have been electrically connected with each other. After they are sealed by the resin member 6a, the lead frame 30 is cut off to produce the lead frame member that comprises the principal parts of the lead frame 30.

Figure 5B:
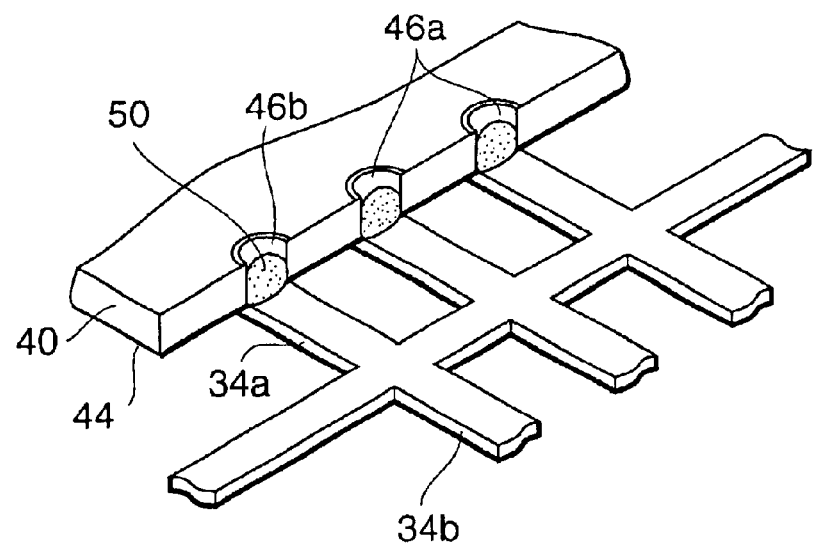
FIG. 5B is an enlarged view showing the connection between lead terminals and the circuit board.

FIG. 5B shows the portion of the connection between the lead frame 30 and the circuit board 40. The inner lead 34a is connected to the electrode 46b of the circuit board 40 via the electrically conductive member 50, such as a solder bump.

Figure 6:
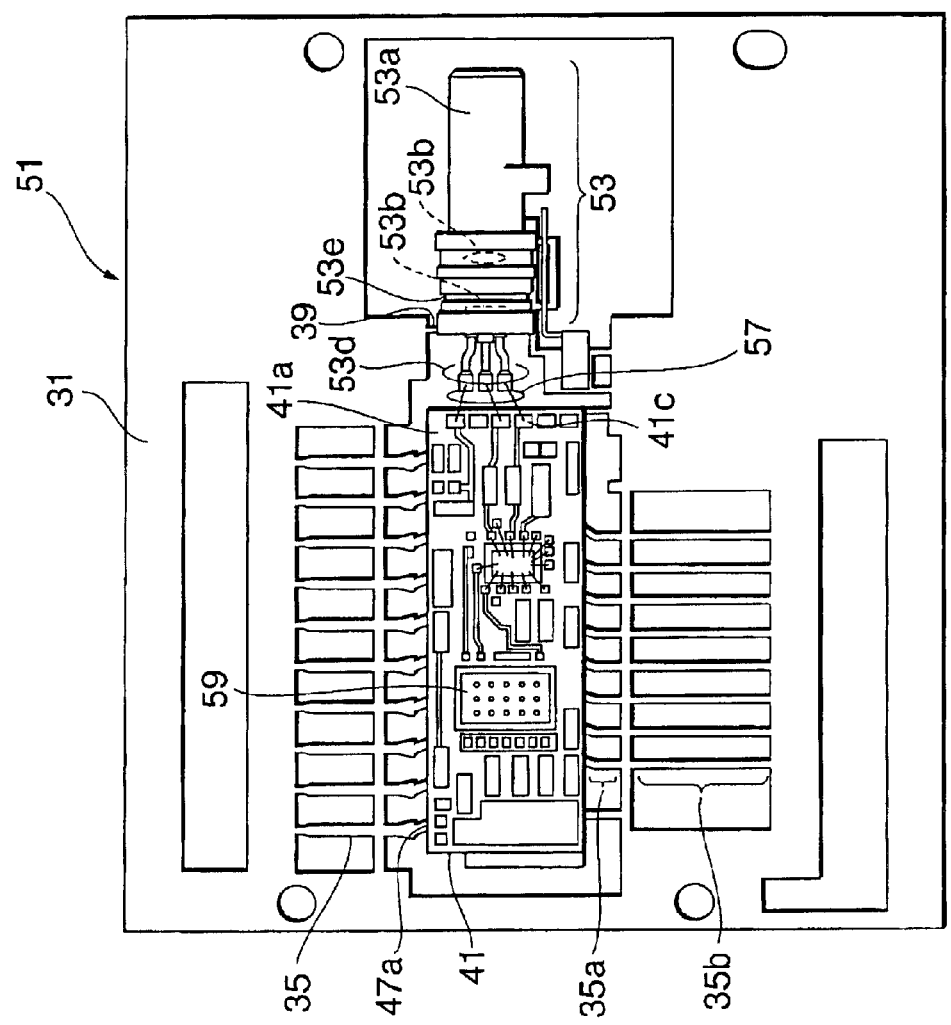
FIG. 6 is a plan view showing an workpiece of the transmitter assembly.

FIG. 6 is a planar view showing a workpiece for the transmitter assembly 8. A workpiece 51 has a lead frame 31, a circuit board 41, and a light emitting device 53. The light emitting device 53 is provided in a light emitting device mounting portion 39. The circuit board 41 is mounted on the island of the lead frame 31 at a predetermined position in which a terminal 47a of the circuit board can be connected to a lead 35. An electronic element 59 is provided on the circuit board 41. In the light emitting device 53, a sleeve 53a made of metal, a semiconductor light emitting element 53b, and a lens 53c are arranged in a direction of the predetermined axis. A package 53e for TOSA accommodates the sleeve 53a, the semiconductor light emitting element 53b and the lens 53c. The package 53e can be a TO-type package, for example, and has lead pins 53d extending in a direction of the predetermined axis. The lead pins 53d are electrically connected via a bonding wire 57 to pads 41c provided on the mount face 41a of the circuit board 41, respectively. In order to make the connection, the lead pins 53d are bent such that the end portions thereof are arranged on the extension plane from the mount face 41a. The lead frame 31, the circuit board 41, and the light emitting device 53 are molded by a sealing resin member (reference numeral 8a in FIG. 1) after they have been electrically connected. After they are sealed by the resin member 6a, the lead frame 31 is cut off to produce the lead frame member that comprises the principal parts of the lead frame 31. The lead frame 31 is cut after same has been sealed by the resin member 8a, and the lead frame member is composed of the principal parts of the lead frame 30. As can be seen from the description as above, the transmitter module 8 has a structure substantially like that for the receiver assembly 6, so a further description therefor is omitted here.

Figure 7:
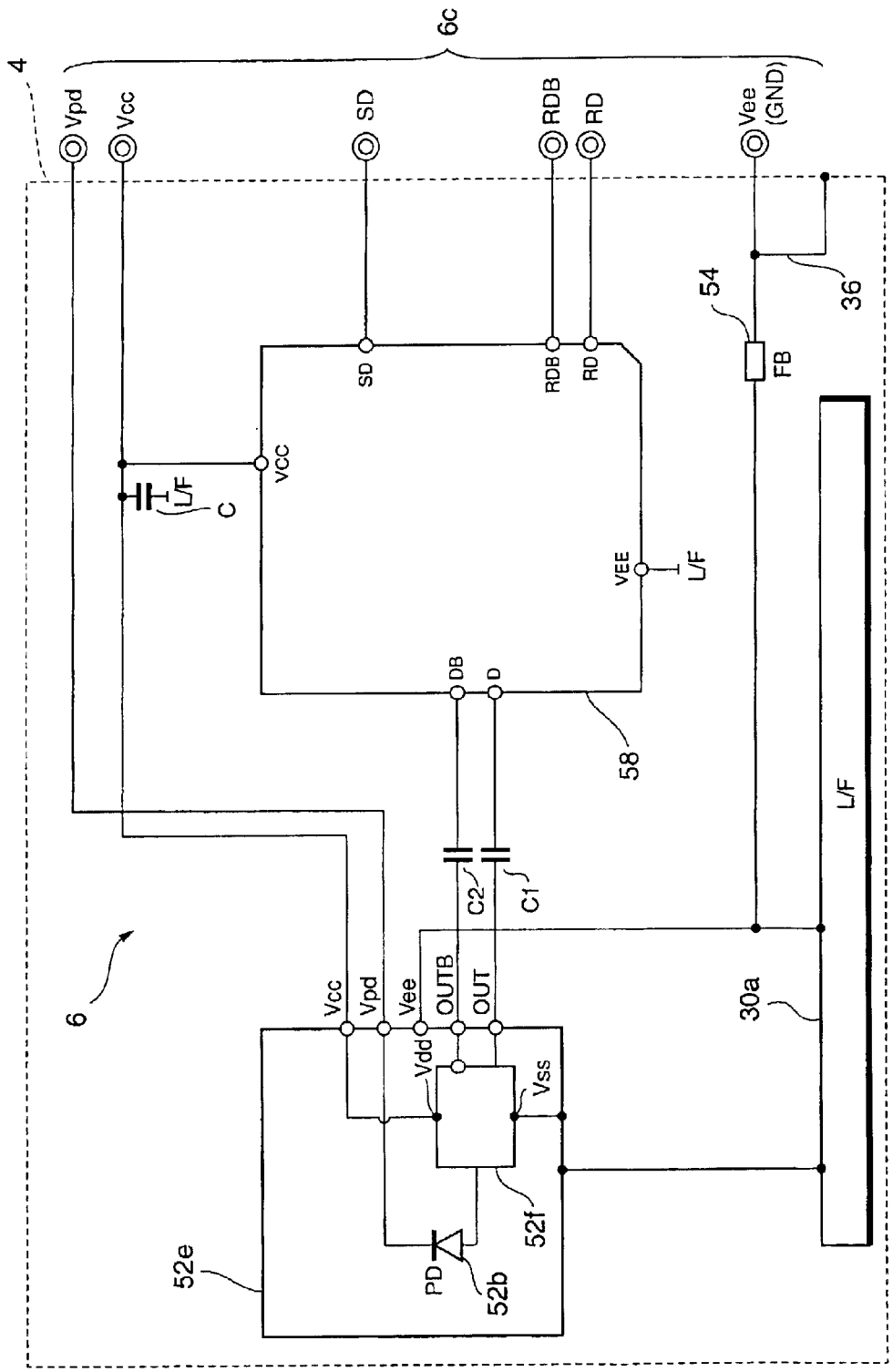
FIG. 7 is an equivalent circuit diagram for the receiver assembly.

FIG. 7 shows an equivalent circuit diagram for the receiver assembly 6. Shown in the equivalent circuit are the main constituent components of the light receiving assembly 6: lead terminals 6c, a lead frame member 30a; a light receiving device housing 52e, such as a TO-type can package; a semiconductor light receiving element 52b, such as a photodiode; and an electronic element 58, such as a signal processing integrated circuit. These components are electrically shielded by the shielding member 4.

Vee terminal, RD terminal, RDB terminal, SD terminal, Vcc terminal, and Vpd terminal are provided as the plurality of lead terminals 6c. Vpd terminal is connected to the cathode of the semiconductor light receiving element 52b in the light receiving device 52e. The anode of the light receiving element 52b is connected to the input of the preamplifier 52f. Vdd terminal of the preamplifier 52f is connected to Vcc terminal. Vss terminal of the preamplifier 52f is connected to Vcc pin. Compliment outputs OUT and OUTB of the preamplifier 52f are connected to signal inputs D and DB of the signal processing integrated circuit 58 via coupling capacitors C1 and C2, respectively. A number of Vee pins of the signal processing integrated circuit 58 are connected to the reference potential line of the lead frame member 30a. Vcc pin of the signal processing integrated circuit 58 is connected to Vcc terminal. The signal processing integrated circuit 58 has a function for identifying the presence and absence of an input signal provided thereto, for generating signal detection signal SD (signal detection indicating the identification result, and for providing a data signal RD. The signal detection signal SD is supplied to SD terminal, and the data signals RD are prepared to be compliment signals, and then are supplied to RD and RDB terminals, respectively.

In the light receiving device, Vee pin is connected to the TO-type can package, and Vee pin is connected to an internal Vee potential line. The internal Vee potential line is connected to Vee terminal via the inductive element 54. The TO-type can package and the reference potential line of the lead frame member 30a are connected to the internal Vee potential line. A capacitor C is connected between Vcc terminal and internal Vee potential line. Vee terminal is connected to the reference potential line of the printed circuit board.

Further, Vee terminal is also connected to the shielding member 4 via the electrically conductive portion 36 of the lead frame member 30a. The shielding member 4 is sometimes electrified in the course of the operation of the optical module 1. Since the shielding member 4 is connected to Vee terminal via the electrically conductive portion 36, the electrostatic charges on the shielding member 4 is thus discharge to the Vee potential line of the printed circuit board. This discharging reduces the electrostatic charges on the shielding member. Moreover, Vee terminal is connected to the internal Vee potential line via the inductive element 54, and the inductive element 54 blocks relatively higher frequency noise, generated at Vee terminal in escaping the electrical charges from the shielding member, that may propagate to the internal Vee potential line.

The following reveals the results of experiments relating to the minimum reception sensitivity of the optical module as described thus far.

Regarding an optical module having connection by means of the electrically conductive portion 36:

Transmitter assembly operated: −22.98 dBm;

Transmitter assembly stopped: −24.49 dBm;

Deterioration due to crosstalk: 1.51 dB

Regarding an optical module having no connection by means of the electrically conductive portion 36:

Transmitter assembly operated: −21.84 dBm;

Transmitter assembly stopped: −24.23 dBm;

Deterioration due to crosstalk: 2.39 dB

Concerning deterioration caused by crosstalk, an estimation for the amount of sensitivity improvement is 0.88 dB.

As described hereinabove, in the optical module according to the present embodiment, the cover member is electrically connected to ground via the electrically conductive portion of the lead frame member. This electrically conductive portion allows the reduction of impedance in high frequency region between the cover member and the ground potential line. Consequently, even if electrical charges are discharged from the transmitter assembly, these electrical charges do not accumulate in the cover member and instead is discharged via the electrically conductive portion of the receiver assembly.

In the optical module having a ferrite bead inductor coupled between the electrically conductive portion and the Vee potential line of the circuit board, the ferrite bead inductor permits the isolation in high frequency region between the electrically conductive portion and the Vee potential line, and can reduce the amount of noise transmitted from the electrically conductive portion.

As described in detail hereinabove, in the optical module according to the embodiments of the present invention, the electrically conductive portion of the assembly portion connects the shielding member to at least one of the plurality of terminals. The shielding member is electrically connected to a terminal in the assembly portion although the number of terminals in the assembly portion is not increased. It is thus possible to provide an optical module capable of reducing the amount of electrostatic charges on a shielding member.

Although the principles of the present invention have been illustrated and described by way of preferred embodiments, it may be recognized by a person skilled in the art that the present invention can be modified in arrangement and detail without departing from such principles. For example, the description has been made for a optical module comprising a receiver assembly and a transmitter assembly, but it could also be changed to an optical module comprising a plurality of receiver assemblies and to an optical module comprising a plurality of transmitter assemblies. Furthermore, the description has been made for a receiver assembly comprising an electrically conductive piece, but an electrically conductive piece could also be added to the lead frame for the transmitter assembly. Therefore, we claim rights to all changes and modifications from the scope of the claims and the spirit.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical module, comprising:
   an assembly portion including an optical device, an electronic element, a circuit board and a plurality of terminals, said optical device including a semiconductor optical element provided so as to be optically coupled to an optical connector, said electronic element being electrically connected to the semiconductor optical element, said circuit board being provided for mounting the electronic element, and said plurality of terminals being electrically connected to the circuit board; and
   a shielding member for shielding the assembly portion, said shielding member including a reference potential terminal provided so as to be connected to a reference potential line,
   wherein the assembly portion includes an electrically conductive portion provided to connect the shielding member to at least one of the plurality of terminals.

2. The optical module as claimed in claim 1, wherein the assembly portion includes a lead frame member, said lead frame member having an island for mounting the circuit board, first leads constituting the plurality of terminals, and a second lead constituting the electrically conductive portion.

3. The optical module as claimed in claim 2,
   wherein the circuit board has a pair of edges extending in a direction of a predetermined axis;
   wherein the plurality of terminals is arranged along one edge of the pair of edges of the circuit board;
   wherein the shielding member is provided so as to face the other edge of the pair of edges of the circuit board; and
   wherein the electrically conductive portion extends from one edge of the pair of edges to the other to reach the shielding member.

4. The optical module as claimed in claim 3, further comprising a resin member for molding the assembly portion, wherein the end of the electrically conductive portion protrudes from the resin member.

5. The optical module as claimed in claim 3,
   wherein the semiconductor optical element is a semiconductor light receiving element, and
   wherein the semiconductor light receiving element and the circuit board are arranged in a direction of the predetermined axis.

6. The optical module as claimed in claim 5, further comprising a resin member for molding the assembly portion, wherein the end of the electrically conductive portion protrudes from the resin member.

7. The optical module as claimed in claim 2, further comprising a resin member for molding the assembly portion, wherein the end of the electrically conductive portion protrudes from the resin member.

8. The optical module as claimed in claim 2,
   wherein the circuit board comprises a pair of faces and an electrically conductive layer provided on one face of the pair of faces,
   wherein the electronic element is mounted on the other face of the pair of faces, and
   wherein the island mounts the circuit board thereon through an insulating member.

9. The optical module as claimed in claim 8, further comprising a resin member for molding the assembly portion, wherein the end of the electrically conductive portion protrudes from the resin member.

10. The optical module as claimed in claim 8,
    wherein the circuit board has a pair of edges extending in a direction of a predetermined axis;
    wherein the plurality of terminals is arranged along one edge of the pair of edges of the circuit board;
    wherein the shielding member is provided so as to face the other edge of the pair of edges of the circuit board; and
    wherein the electrically conductive portion extends from one edge of the pair or edges to the other to reach the shielding member.

11. The optical module as claimed in claim 10, further comprising a resin member for molding the assembly portion,
    wherein the end of the electrically conductive portion protrudes from the resin member.

12. The optical module as claimed in claim 10,
    wherein the semiconductor optical element is a semiconductor light receiving element, and
    wherein the semiconductor light receiving element and the circuit board are arranged in a direction of the predetermined axis.

13. The optical module as claimed in claim 12, further comprising a resin member for molding the assembly portion, wherein the end of the electrically conductive portion protrudes from the resin member.

14. The optical module as claimed in claim 1, wherein the circuit board has a pair of edges extending in a direction of a predetermined axis;

wherein the plurality of terminals is arranged along one edge of the pair of edges of the circuit board;

wherein the shielding member is provided so as to face the other edge of the pair of edges of the circuit board; and wherein the electrically conductive portion extends from one edge of the pair of edges to the other to reach the shielding member.

15. The optical module as claimed in claim 14, further comprising a resin member for molding the assembly portion, wherein the end of the electrically conductive portion protrudes from the resin member.

16. The optical module as claimed in claim 14, wherein the semiconductor optical element is a semiconductor light receiving element, and wherein the semiconductor light receiving element and the circuit board are arranged in a direction of the predetermined axis.

17. The optical module as claimed in claim 16, further comprising a resin member for molding the assembly portion, wherein the end of the electrically conductive portion protrudes from the resin member.

18. The optical module as claimed in claim 1, further comprising a resin member for molding the assembly portion, wherein the end of the electrically conductive portion protrudes from the resin member.

* * * * *